United States Patent [19]

Wada et al.

[11] Patent Number: 4,499,178

[45] Date of Patent: Feb. 12, 1985

[54] OPTICAL INFORMATION RECORDING MATERIAL

[75] Inventors: Minoru Wada; Yonosuke Takahashi; Eiichi Hasegawa, all of Saitama, Japan

[73] Assignee: Fuji Photo Film Co., Ltd., Kanagawa, Japan

[21] Appl. No.: 388,336

[22] Filed: Jun. 14, 1982

[30] Foreign Application Priority Data

Jun. 12, 1981 [JP] Japan .................................. 56-90378

[51] Int. Cl.$^3$ ............................ G03C 5/04; G03F 7/00
[52] U.S. Cl. ..................................... 430/495; 430/271;
430/276; 430/524; 430/525; 430/526; 430/531;
430/533; 430/536; 430/538; 430/945; 428/458;
428/461; 428/463; 428/469; 428/689; 428/702;
428/913; 346/135.1
[58] Field of Search ............... 430/945, 524, 525, 526, 430/531, 533, 536, 538, 271, 276, 271 A, 495; 346/135.1; 428/913, 469, 458, 461, 463, 689, 702

[56] References Cited

U.S. PATENT DOCUMENTS

| 4,188,214 | 2/1980 | Kido et al. ........................ 430/945 |
| 4,216,501 | 8/1980 | Bell .................................... 346/135.1 |
| 4,309,713 | 1/1982 | Shinozaki et al. ................. 430/536 |
| 4,345,261 | 8/1982 | Wilkinson .......................... 430/945 |

OTHER PUBLICATIONS

Bartolini et al., "Optical Disk Systems Emerge" IEEE Spectrum 1978, pp. 20-28.

Primary Examiner—Mary F. Downey
Attorney, Agent, or Firm—Sughrue, Mion, Zinn, Macpeak and Seas

[57] ABSTRACT

An optical information recording material which comprises a substrate having thereon a heat mode recording layer made of a metal and a metal compound that increases the sensitivity of said recording layer and decreases the reflectivity of said recording layer, a reflecting layer made of a metal, and a heat insulating layer interposed between said recording layer and said reflecting layer. The material makes it possible to record information at high sensitivity and read recorded information by reflected light at high contrast.

18 Claims, 7 Drawing Figures

OPTICAL INFORMATION RECORDING MATERIAL

FIELD OF THE INVENTION

The present invention relates to an optical information recording material having a heat mode recording layer.

BACKGROUND OF THE INVENTION

Recording materials have been disclosed on which records are made thermally by the use of light beams like laser having a high energy density. In such thermal recording materials, information is recorded by creating differences in optical density on the recording layer. The recording layer has high optical density and absorbs light beams of high energy density which impinge thereon. The absorption of light brings about a local temperature rise, causing a thermal change such as melting-cohesion or evaporation to take place in the recording layer. As a result, the irradiated parts of the recording layer are removed, and a difference in optical density is formed between the irradiated parts and the unirradiated parts (cf. U.S. Pat. Nos. 4,216,501, 4,233,626, 4,188,214 and 4,291,119 and British Pat. No. 2,026,346).

These thermal recording materials usually do not require development and fixing processes and do not require darkroom operations because of their insensitivity to room light. In addition, they provide high-contrast images and make it possible to add information later on.

Recording on such thermal recording materials is usually accomplished by converting the information to be recorded into electrical time series signals and scanning the recording material with a laser beam which is modulated in accordance with the signals. This method is advantageous in that recording images can be obtained on real time (i.e. instantaneously).

The recording layer of such thermal recording materials is usually made of inexpensive metals, dyes, or plastics. Recording materials like this are described in "Electron, Ion, and Laser Beam Technology", by M. L. Levene et al.; The Proceedings of the Eleventh Symposium (1969); "Electronics" (Mar. 18, 1968), P. 50; "The Bell System Technical Journal", by D. Maydan, Vol. 50 (1971), P. 1761; and "Science", by C. O. Carlson, Vol. 154 (1966), P. 1550.

In accordance with previously used methods, some of the metal recording layers are formed by depositing a thin film of Bi, Sn, or In on the substrate. Such recording layers are superior as thermal recording materials because they permit the recording of images with good resolution at high contrast. However, they are disadvantageous in that the metal thin film reflects more than 50% of the laser light, wasting the energy of the laser light. Accordingly, such material may require a substantial amount of energy for recording. Therefore, a high output laser light source is required if records are to be made by high-speed scanning. This makes it necessary to use a large, expensive recording apparatus.

In order to overcome the above drawbacks, efforts have been made to find recording materials having high sensitivity. An example of such a recording material is disclosed in Japanese Patent Publication No. 40479/1971. According to this disclosure, the recording material is made up of three thin films of Se, Bi, and Ge. The extremely thin top layer of Ge is provided to reduce reflection by the thin films of Se and Bi. Nevertheless, they are not capable of producing recorded images of satisfactory quality.

There is disclosed in Japanese Application (OPI) No. 74632/1976 (the term "OPI" as used herein refers to a "Published unexamined Japanese Patent Application) another example of recording materials having an anti-reflection layer. According to this disclosure, the metal layer is coated with an anti-reflection layer which absorbs the laser light of specific wavelengths for recording. However, such an arrangement is not desirable because the antireflection layer reduces the reflectivity of the unrecorded parts. The small difference in reflectivity between the recorded parts and unrecorded parts makes it difficult to read the recordings by means of reflected light.

A recording layer comprised of a highly reflective metal is suitable for reading recordings by means of reflected light. However, such a recording layer posesses low sensitivity with respect to information recording. On the other hand, a recording layer which is rendered highly sensitive by providing an antireflection layer is not suitable for reading recordings by means of reflected light. A proposal for dealing with these conflicting characteristics was proposed in Japanese Patent Application (OPI) Nos. 120506/1978 (corresponds to U.S. Pat. No. 4,216,501) and 122403/1978 (corresponds to U.S. Pat. No. 4,233,626) which disclose a recording material which includes a dielectric layer and a bottom reflection layer placed between the recording layer and the substrate. According to these disclosures, the recording layer is made of a metal such as rhodium which has a high reflectivity. Therefore, if the recording sensitivity is to be increased and the records are to be read by reflection at high contrast, the recording material should be of the nega-posi type which produces positive images from negative originals. Such nega-posi type can be produced by strictly defining the thickness of each layer according to the wavelength of the light used for reading so that the reflectivity of the light used for reading is minimized.

As mentioned above, conventional recording materials are not desirable because accurate control is required in order to make the film layers. Furthermore, the light for reading the records is limited with respect to wavelength, and the incident angle of light for reading the records is limited.

SUMMARY OF THE INVENTION

It is an object of the present invention to provide an optical information recording material which makes it possible to record information at high sensitivity and read recorded information by reflected light at high contrast.

It is another object of this invention to provide an optical information recording material which does not need that the thickness of the layers constituting the recording material be accurately controlled.

A further object of this invention is to provide an optical information recording material which is not restricted with respect to wavelength or the incident angle of the light for reading the records.

The optical information recording material of this invention comprises (a) a heat mode recording layer comprised of a metal and a metal compound that increases the sensitivity of said recording layer and decreases the reflectivity of said recording layer (b) a reflecting layer comprised of a metal, and (c) a heat insulating layer interposed between said recording layer and said reflecting layer, said layers being supported on a substrate.

DETAILED DESCRIPTION OF THE INVENTION

Figure 1:
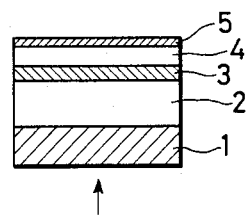
FIG. 1 and FIG. 2 are sectional views showing the structure of the layers of the optical information recording material of this invention.
Figure 2:
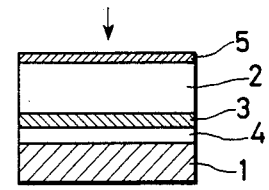

The recording material of this invention has a sectional structure as shown in FIG. 1 and FIG. 2, in which there are shown a substrate 1, recording layer 2, heat insulating layer 3, reflecting layer 4, and protective layer 5.

The substrate 1 may be in the form of a film, sheet, or plate of plastics such as polyethylene terephthalate, polymethyl methacrylate, and copolymers containing methyl methacrylate, ethylene, styrene, or vinyl chloride; glass plate; paper; or metal plate or foil, which are transparent or opaque to the light. These forms and compounds are commonly used for optical information recording materials.

The metal used for the recording layer in this invention includes Mg, Sc, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Sn, As, Sb, Bi, Se, and Te, which are used individually or in a mixture or an alloy of at least two metals thereof. Preferably among them are Mg, Zn, Al, In, Sn, Bi, and Te due to their low melting point.

A compound which increases the sensitivity of the recording layer and decreases the reflectivity of the recording layer is disclosed in Japanese Patent Application (OPI) Nos. 28236/1976 and 20821/1977 (corresponds to U.S. Pat. Nos. 4,188,214 and 4,291,119). Preferred examples of the metal compound are CrS, $Cr_2S$, $Cr_2S_3$, $MoS_2$, MnS, FeS, $FeS_2$, CoS, $Co_2S_3$, NiS, $Ni_2S$, PdS, $Cu_2S$, $Ag_2S$, ZnS, $In_2S_3$, InS, $GeS_x$ ($1 \leq x \leq 2$), SnS, $SnS_2$, PbS, $As_2S_3$, $Sb_2S_3$, $Bi_2S_3$, $MgF_2$, $CaF_2$, $RhF_3$, MoO, InO, $In_2O_3$, GeO, PbO, SiO, $SiO_2$, SnO, and $SnO_2$, which may be used individually or in combination. The most preferred examples of the metal compounds are $Cu_2S$, ZnS, $In_2S_3$, InS, $GeS_x$ ($1 \leq x \leq 2$), SnS, $SnS_2$, PbS, $As_2S_3$, $Sb_2S_3$, $Bi_2S_3$, $MgF_2$, $CaF_2$, $RhF_3$, MoO, InO, $In_2O_3$, GeO, PbO, SiO, $SiO_2$, SnO, $SnO_2$ and a mixture thereof.

The recording layer of this invention may be comprised of a mixture of the metal used for the recording layer and the aforesaid metal compound. Alternatively, the recording layer may be produced by laminating at least one layer of the aforesaid metal layer and at least one layer of the aforesaid metal compound layer.

When the metal layer and the metal compound layer are laminated, they may be placed over each other, or the metal layer may be sandwiched by two metal compound layers, or more than two of the metal layers and the metal compound layers may be laminated alternately. If only one metal compound layer is used, it may be placed on either side of the metal layers. If more than two metal compound layers and metal layers are used, either of them may be brought into contact with the substrate.

Figure 3:
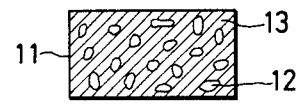
FIG. 3 to FIG. 7 are sectional views showing the structure of the recording layer of the optical information recording material of this invention.
Figure 4:
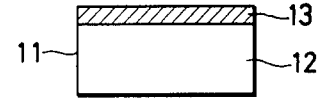
Figure 5:
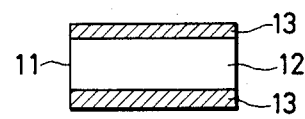
Figure 6:
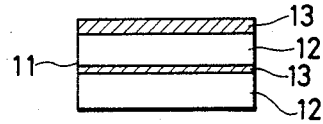
Figure 7:
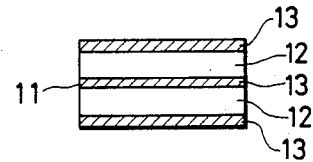

The structure of the recording layer of the recording material of this invention is described with reference to FIGS. 3 to 7, in which there are shown the recording layer 11, the metal 12, and the metal compound 13. FIG. 3 schematically shows the recording layer composed of a mixture of the metal and metal compound. FIGS. 4 to 7 show examples of recording layers which are made up of at least one metal layer and at least one metal compound layer laminated one over another.

The thickness of the recording layer is usually 30 to 1500 Å, preferably 50 to 1000 Å, depending on the material to be used. If the thickness is less than 30 Å, the recorded images do not have sufficiently different densities. If the thickness of the recording layer is greater than 1500 Å, the sensitivity tends to decrease.

If the metal layers and compound layers are laminated over one another, each thickness of the metal layer and the metal compound layer may be determined optionally.

The quantity of the metal compound in the recording layer preferably is 10 to 70 vol %, more preferably 20 to 50 vol % (based on the total volume of the recording layer) regardless of whether the metal compound is mixed with the metal or the metal compound layer is laminated onto the metal layer. If it is less than 10 vol %, the effect is not sufficient; and if it is greater than 70 vol %, the sensitivity tends to decrease.

The recording layer of this invention is comprised of a mixture of the metal and metal compound or a laminate of the metal layer and the metal compound layer. The recording layer may be provided by vapor deposition, sputtering, ion plating, chemical vapor deposition, electrolytic plating, or electroless plating.

The purpose of the reflecting layer of the recording material of this invention is to create a greater difference, with respect to the reflectivity for reading light between the recorded parts and the unrecorded parts. The reflecting layer is made of a metal having a reflectivity of greater than 40%, preferably greater than 60%, with respect to the light used for reading. Above described metals which are used in a recording layer can also be used as a reflecting layer. The most preferable examples of such metals include Rh, Pd, Pt, Ag, Al, In, and Sn.

The thickness of the reflecting layer should be 300 to 3,000 Å, preferably 500 to 2,000 Å. If the thickness is less than 300 Å, the effect of reflecting light is not sufficient. However, if the thickness is greater than 3,000 Å the effect is not improved any further.

The reflecting layer may be provided in the same manner as the recording layer.

Since the recording layer and the reflecting layer are made of a metal having a high thermal conductivity, the heat energy of the recording beam absorbed by the recording layer is conveyed to the reflecting layer. Thus it is necessary to provide for means of preventing the loss of heat energy due to such heat conduction and to protect the reflecting layer from thermal deformation. To this end, a heat insulating layer is provided between the recording layer and the reflecting layer. The heat insulating layer is generally comprised of an organic or inorganic material having a thermal conductivity smaller than 0.01 J/cm.sec °C., preferably smaller then 0.005 J/cm.sec.° C. Examples of such materials include organic substances such as polyester, polyethylene, polystyrene, acrylic polymer, cellulose acetate, cellulose nitrate, brominated polyhydroxystyrene, and chlorinated rubber; and non-metallic substances such as SiO and $SiO_2$. The thickness of this heat insulating layer should be 0.01 to 5 μm, and preferably 0.05 to 2 μm. If the thickness is less than 0.01 μm, the effect of heat insulation is not sufficient; and if it is more than 5 μm, the contrast decreases at a particular angle of light.

The protective layer formed on the aforesaid recording layer is apparently effective to improve the durability, mechanical strength, and storability. The protective layer may be comprised of either inorganic substances or organic substances, but it should be transparent to the high energy light beam which is used, if irradiation for recording is conducted from the side of the protective layer. In addition, it should be high in mechanical strength, inert to the recording layer, good in film forming ability and easily formed into a layer.

The protective layer of this invention may be comprised of either inorganic substances or organic substances.

Inorganic substances used for the protective layer include, for example, $Al_2O_3$, $SiO_2$, SiO, MgO, ZnO, $TiO_2$, $ZrO_2$, $MgF_2$, and $CuF_2$ (These Metal compounds forms transparent protective layers). The protective layer may be formed by vapor deposition, sputtering, or ion plating.

A protective layer of synthetic resin also obtain desirable results. Examples of such synthethic resins include styrene resins such as polystyrene and styrene-maleic anhydride resin; vinyl acetate resins such as polyvinyl acetate, polyvinyl alcohol, polyvinyl butyral and polyvinylformal; methacrylate ester resins such as polyisobutyl methacrylate and polymethyl methacrylate; amide resins such as polydiacetone acrylamide and polyacrylamide; cellulosic resins such as ethyl cellulose, cellulose acetate butyrate, cellulose nitrate, and diacetyl cellulose; halogenated olefin resins such as polyvinyl chloride and chlorinated polyethylene; phenolic resin; soluble polyester; soluble nylon; and gelatin; and copolymers of monomers forming the aforesaid polymers. These resins may be used individually or in combination. These resins may be applied from a solution by known methods.

Solvents which are useful for dissolving the resins include, acetone, methyl ethyl ketone, methyl isobutyl ketone, methyl cellosolve, ethyl cellosolve, butyl cellosolve, methyl cellosolve acetate, ethyl cellosolve acetate, butyl cellosolve acetate, hexane, cyclohexane, ethylene chloride, methylene chloride, benzene, chlorobenzene, methanol, ethanol, butanol, petroleum ether, dimethylformamide, and thinner. Selection should be made according to the resin used.

These resins may be incorporated with a variety of additives such as pigments, matting agents, plasticizers, and slip agents according to the desired purpose. Incorporating the resin with a higher fatty acid having 11 or more carbon atoms or an acid amide in an amount of 0.1 to 10 wt % is effective to impart slipperiness and to improve the surface strength of the recording material.

A slipping agent such as a higher fatty acid and/or an acid amide may be applied in a thickness of 0.001 to 1 micron in the usual way. The thickness of the protective layer is 0.01 to 500 μm, depending on the desired surface strength, storability, and recording sensitivity.

A gap formed by inert gas such as air or $N_2$ gas may be formed between the recording layer and the protective layer by providing a proper spacer between them.

The recording material of this invention will be applied to optical discs, but the application is not limited to them.

Recording of information on the recording material of this invention is accomplished by irradiating a light beam onto the recording layer from the side opposite the reflecting layer. Retrieval or reading of the records is also accomplished by irradiating the layer with a light beam from the same side. When using a recording material having the layer structure shown in FIG. 1, irradiation for recording and retrieving is accomplished through the substrate. The substrate which is used in such a recording material should be transparent to the light used. When using a recording material having the layer structure shown in FIG. 2, the substrate may or may not be transparent to the light used.

When information is to be recorded, irradiation should be made in such a manner that thermal deformation takes place only in the recording layer. Thermal deformation should not take place in the adjacent reflecting layer.

If the thickness of each layer is such that the reflectivity of the reflecting layer decreases when a specific light is used, and if such a light is used for retrieval it is possible to read nega-posi type records. However, it is not necessary to precisely determine the thickness of the layers and select a specific wavelength of light. As long as the thickness of each layer is within the range that permits each layer to perform its functions, it is possible to obtain posi-posi type or nega-nega type records using any light.

The light beam used for recording information is a high energy light beam like a laser beam or xenone flash, and the light used for retrieving information is, for example, a laser beam or a visible ray.

As mentioned above, the recording material of this invention can be used for high sensitivity recordings. Using the material of invention makes it possible for the records to be read or retrieved in the form of images having high contrast.

EXAMPLE 1

The recording material of this invention was prepared by vapor deposition of Al in a thickness of 1000 Å on a 1-mm thick polymethyl methacrylate substrate, applying nitrocellulose in a thickness of 0.5 μm on the Al layer, and finally co-depositing In and GeS (in volume ratio of 3:1) in a total thickness of 400 Å on the nitrocellulose layer by vapor deposition.

Recording was accomplished by scanning the recording material with a light beam at a rate of 19 m/s. The light beam was produced by concentrating an argon ion laser, having a wavelength of 5145 Å and an output of 200 mW, into a beam of about 25 μm in diameter. Record lines, 10 μm wide, were formed, and they could be read clearly by reflected light. (The difference of reflectances between the recorded area and the non-recorded area was about 30%).

For comparison, a recording material was prepared by depositing In in a thickness of 300 Å instead of codepositing In and GeS. This recording material required a laser output of 350 mW, and gave low contrast images which were difficult to read with reflected light.

EXAMPLE 2

The recording material of this invention was prepared by co-depositing Sn and SnS (in volume ratio of 3:1) in a total thickness of 400 Å on a 1-mm thick polymethyl methacrylate substrate, applying nitrocellulose in a thickness of 0.5 μm, and finally depositing Al by vapor deposition in a thickness of 1000 Å.

Recording was accomplished by scanning the recording material with a light beam at a rate of 19 m/s. The light beam was produced by concentrating an argon ion laser, having a wavelength of 5145 Å and an output of 300 mW, into a beam of about 25 μm in diameter. Record lines, 10 μm wide, were formed, and they could be read clearly by reflected light. (The difference of reflectances between the recorded area and the non-recorded area was about 30%).

For comparison, a recording material was prepared by depositing Sn in a thickness of 300 Å instead of codepositing Sn and SnS. This recording material required a laser output of 400 mW to obtain 10 μm wide recorded lines, and gave low contrast images which were difficult to read with reflected light. (The difference of reflectances between the recorded area and the non-recorded area was about 10%).

What is claimed is:

1. An optical information recording material which comprises a substrate having thereon a heat mode recording layer made of a metal and a metal compound that increases the sensitivity of said recording layer and decreases the reflectivity of said recording layer, the metal compound being selected from the group consisting of $CrS$, $Cr_2S$, $Cr_2S_3$, $MoS_2$, $MnS$, $FeS$, $FeS_2$, $CoS$, $Co_2S_3$, $NiS$, $Ni_2S$, $PdS$, $Cu_2S$, $Ag_2S$, $In_2S_3$, $InS$, $GeS_x$ ($1 \leq x \leq 2$), $SnS$, $SnS_2$, $PbS$, $As_2S_3$, $Sb_2S_3$, $Bi_2S_3$, $MgF_2$, $CaF_2$, $RhF_3$, $MoO$, $InO$, $In_2O_3$, $GeO$, $PbO$, $SnO$, and $SnO_2$, the metal being selected from the group consisting of Mg, Sc, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Sn, As, Sb, Bi, Se, Te, mixtures thereof, and alloys thereof, a reflecting layer made of a metal wherein the metal used in said reflecting layer is a metal which can be used in said recording layer, and a heat insulating layer interposed between said recording layer and said reflecting layer.

2. An optical information recording material as claimed in claim 1, wherein the metal compound of the recording layer is present in an amount of about 10 to 70 vol % based on the total volume of the recording layer.

3. An optical information recording material as claimed in claim 1, wherein the recording layer is composed of a mixture of a metal and a metal compound.

4. An optical information recording material as claimed in claim 1, wherein the recording layer is composed of at least one metal layer and at least one layer of the compound, said layers being laminated one over another.

5. An optical information recording material as claimed in claim 1, wherein the recording layer has a thickness of from 30 to 1500 Å.

6. An optical information recording material as claimed in claim 1, wherein the reflecting layer is Rh, Pd, Pt, Ag, Al, In, or Sn.

7. An optical information recording material as claimed in any of claims 1 or 2, wherein the reflecting layer has a thickness of about 300 to 3000 Å.

8. An optical information recording material as claimed in claim 1, wherein the heat insulating layer has a thermal conductivity lower than 0.01 Joule/cm.sec.° C.

9. An optical information recording material as claimed in claim 1, wherein the heat insulating layer is made of polyester, polyethylene, polystyrene, acrylic polymer, cellulose acetate, cellulose nitrate, brominated polyhydroxystyrene, chlorinated rubber, SiO, or $SiO_2$.

10. An optical information recording material as claimed in any of claims 1 or 2, wherein the heat insulating layer has a thickness of about 0.01 to 5 μm.

11. An optical information recording material as claimed in claim 1, further comprising a protective layer formed on the recording material.

12. An optical information recording material as claimed in claim 11, wherein the protective layer has a thickness of from 0.001 to 1 μm.

13. An optical information recording material as claimed in claim 1, wherein the reflecting layer, the heat insulating layer, and the recording layer are formed on the substrate in the order listed.

14. An optical information recording material as claimed in claim 1, wherein the substrate is transparent and the recording layer, the heat insulating layer, and the reflecting layer are formed on the substrate in the order listed.

15. An optical information recording material as claimed in claim 2, wherein the metal compound of the recording layer is present in an amount of about 20 to 50 vol % based on the total volume of the recording layer.

16. An optical information recording material as claimed in claim 7, wherein the reflecting layer has a thickness of about 500 to 2000 Å.

17. An optical information recording material as claimed in claim 10, wherein the heat insulating layer has a thickness of about 0.05 to 2 μm.

18. A method for recording information comprising irradiating a light beam on an optical information recording material which comprises a heat mode recording layer made of a metal and a metal compound that increases the sensitivity of said recording layer and decreases the reflectivity of said recording layer, the metal compound being selected from the group consisting of $CrS$, $Cr_2S$, $Cr_2S_3$, $MoS_2$, $MnS$, $FeS$, $FeS_2$, $CoS$, $Co_2S_3$, $NiS$, $Ni_2S$, $PdS$, $Cu_2S$, $Ag_2S$, $In_2S_3$, $InS$, $GeS_x$ ($1 \leq x \leq 2$), $SnS$, $SnS_2$, $PbS$, $As_2S_3$, $Sb_2S_3$, $Bi_2S_3$, $MgF_2$, $CaF_2$, $RhF_3$, $MoO$, $InO$, $In_2O_3$, $GeO$, $PbO$, $SnO$, and $SnO_2$, the metal being selected from the group consisting of Mg, Sc, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Sn, As, Sb, Bi, Se, Te, mixtures thereof, and alloys thereof, a reflecting layer made of a metal wherein the metal used in said reflecting layer is a metal which can be used in said recording layer, and a heat insulating layer interposed between said recording layer and said reflecting layer, said layers being supported on a substrate.

* * * * *